Oct. 10, 1967
F. H. COLLINS
3,346,686
METHOD OF UNITING FOAMED PLASTIC SHEETS
AND THERMOFORMING THE SAME
Filed May 27, 1964
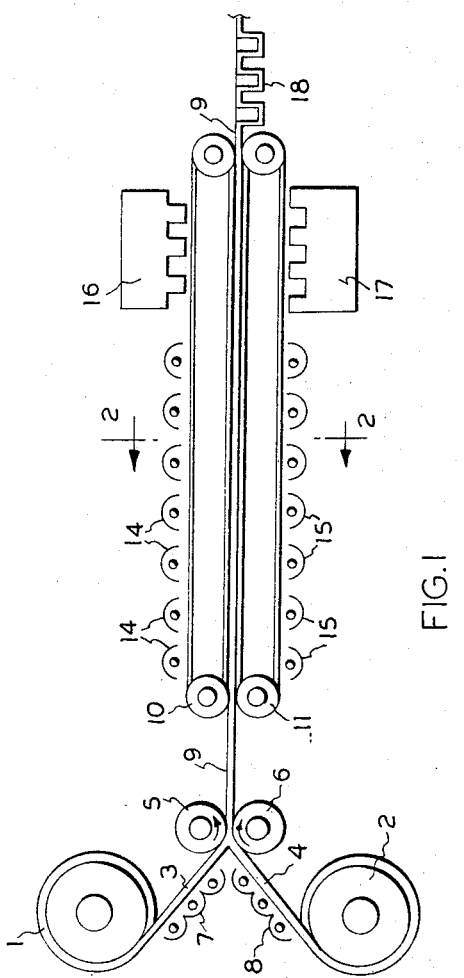
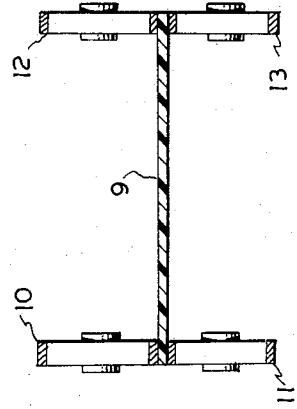
INVENTOR
FREDERICK H. COLLINS
BY *Fisher, Christen, Sabol & Caldwell*
ATTORNEYS United States Patent Office 3,346,686
Patented Oct. 10, 1967

3,346,686
METHOD OF UNITING FOAMED PLASTIC SHEETS AND THERMOFORMING THE SAME
Frederick H. Collins, Cedar Grove, N.J., assignor, by mesne assignments, to W. R. Grace & Co., New York, N.Y., a corporation of Connecticut
Filed May 27, 1964, Ser. No. 370,508
4 Claims. (Cl. 264—321)

This invention relates to novel methods for forming thermoplastic foam sheets into articles and, more particularly, relates to methods of providing heat to the internal parts of composite thermoplastic foam sheets so as to avoid rupturing of said sheets during subsequent forming operations.

Foam sheets are well recognized as having high thermal insulating properties and, as a result, it has been a difficult problem to raise the temperature of the internal portions of thermoplastic foam sheets sufficiently to render such sheets readily formable by conventional vacuum-forming or draw-forming processes. For example, polystyrene foam sheets having a thickness of 0.075 inch or more are extremely difficult to heat sufficiently from the outside inwardly without destroying the outer surfaces of the sheet. In this respect, the heat intensity required to penetrate into the inner portions of the sheet is usually so great that the structure of the outer portions of the sheet is destroyed by cellular collapse and de-orientation.

Therefore, an object of the invention is to provide a novel method for thermoforming articles from relatively thick foam sheets by process such as draw-forming or vacuum forming.

It is a further object of this invention to provide a method for heating a thermoplastic foam sheet throughout without deteriorating any portion of said sheet because of overheating.

Further objects and advantages will be apparent from the following detailed description taken in conjunction with the appended drawing, in which:

FIG. 1 represents a diagrammatic view of one embodiment of the invention; and

FIG. 2 is a cross-sectional view on line 2—2 of FIG. 1.

The present invention is based on the discovery that a composite thermoplastic foam sheet sufficiently heated throughout for easy forming into articles without breaking or rupturing can be provided by heating a surface of each of two thermoplastic foam plies having a combined thickness at least equal to the thickness of the composite thermoplastic foam sheet from which it is desired to form the article, thereafter pressing said heated surfaces together and subsequently forming the resulting composite sheet into the desired article by draw-forming or vacuum-forming techniques in the usual manner. All surfaces of the plies of thermoplastic foam which are combined to make the composite sheet are eventually heated prior to the forming operation and this can be performed in one or more heating operations.

Overheating of polystyrene foam sheets first causes the cells thereof to collapse as visually indicated by the development of an increased shininess in the surface. The cells are thought to rupture and flatten out resulting in de-orientation and thinning out and shrinking of the sheet. The thinning out and shrinkage continue progressively until the sheet ruptures. Shrinkage continues to quickly enlarge the rupture or hole until the sheet is rendered substantially useless except as scrap. While cellular collapse and de-orientation are not usually preferred, such conditions are tolerable in certain instances, so long as the sheet is not ruptured.

The surfaces of the component plies which will form the exterior surface of the composite sheet preferably are not heated prior to pressure bonding the plies together so as to retain the dimensional stability of the plies prior to and just subsequent to pressure bonding. In such case, heat is applied to the external surfaces of the composite sheet while it is held dimensionally stable by suitable means such as a tenter frame or chains gripping each side portion of said sheet in the conventional manner. Reference is made to copending U.S. patent application, Ser. No. 145,541, for Forming Machine and Process, filed Oct. 13, 1961 now United States Patent No. 3,189,399 issued June 15, 1965, to William H. Jacobs et al., as describing a method and apparatus for forming thermoplastic foam sheet as one example of a forming method and apparatus to which the present invention can be applied.

Referring now to FIGS. 1 and 2, there is shown an upper roll 1 and a lower roll 2 of polystyrene foam sheets or plies 3 and 4, respectively. The polystyrene foam plies 3 and 4 are fed into the nip of rollers 5 and 6 which press said plies together. A bank of infra-red heating lamps 7 heats the under side of the ply 3 after it leaves upper roll 1 and prior to contact with roller 5. In a similar manner, a bank of heating lamps 8 heats the upper surface of ply 4 after it leaves lower roll 2 and before it joins ply 3. The banks of heating lamps 7 and 8 are sufficient to heat the respective surfaces of the plies 3 and 4 to a temperature which is below that at which the polystyrene foam of said plies undergoes cellular collapse and/or de-orientation leading to the destruction or rupturing of the heated outer portions thereof. However, the surfaces of said plies should be heated to at least the temperature at which said sheets can be bonded together. A typical polystyrene foam which can represent the plies 3 and 4 is a sheet having a thickness of 0.05 inch and a density of 7 pounds per cubic foot. The respective surfaces of these plies can be heated by the banks of heating lamps 7, 8 to a temperature in the range of 180° F. to 250° F. The nip opening between rollers 5 and 6 is no greater than the combined thicknesses of the plies as they enter said nip opening.

A composite sheet 9 is formed by bonding plies 3 and 4 together between rollers 5 and 6 and said composite sheet has a thickness approximately equal to the combined thicknesses of plies 3 and 4. The composite sheet 9 is then gripped along both edges by suitable means, e.g., chain pairs 10, 11 and 12, 13, which prevent shrinkage of said sheet during subsequent heating. Upper and lower banks of heating lamps 14, 15 respectively heat the upper and lower surfaces of composite sheet 9 while it is gripped by chain pairs 10, 11 and 12, 13. The composite sheet 9 is heated by the banks of heating lamps 14 and 15 to a temperature whereat said sheet is pliable and formable, e.g., within the softening range of said sheet, but below that temperature at which said sheet undergoes cellular collapse and/or de-orientation resulting in rupturing of said sheet. In the case of polystyrene foam, the temperature to which the composite sheet 9 is heated can range from 180° F. to 250° F.

The composite sheet 9 then passes between forming platens comprising a male member 16 and a female member 17. The composite sheet 9 is formed into the desired article or articles 18 by members 16 and 17 in the usual manner of draw-forming or vacuum forming and thence passes out from a position between said members. The drawing of an article, such as a cup, is now possible. The formed composite sheet 9 and articles 18 are then passed to succeeding operations, such as, trimming, punching, cutting, etc.

By way of example, two polystyrene plies 3, 4 of about 0.100 inch thickness and about 7 pounds per cubic foot density were super-imposed and fed into the nip of pressure rollers 5, 6 having a nip opening of about 0.190 inch. The surfaces of said plies to be contacted were heated to a temperature of 240° F. by banks of heating lamps 7, 8 prior to entering the nip of rollers 5, 6. The composite sheet 9 formed from said plies had a thickness of about 0.200 inch and a density of about 7 pounds per cubic foot. Both surfaces of the composite sheet were heated to about 240° F. and then the sheet was formed into drinking cups having a density of about 5 pounds per cubic foot and wall thicknesses of about 0.075 inch.

The movement of the plies 3 and 4 and the composite sheet 9 can be continuous or intermittent, depending upon the particular type of forming apparatus employed. There are available continuous forming machines wherein the sheet being formed passes continuously through the machine. There are also available machines wherein the composite sheet travels intermittently through the machine, stopping when the male and female forming members operate on the sheet and traveling when said forming members are in "rest" position. Either type of machine can be employed in the present invention.

It will be readily seen that the plies 3 and 4 are brought together as quickly as possible after their meeting surfaces have reached a suitable bonding temperature. It will also be noted that the composite sheet 9 should be passed forthwith into the heating chamber, i.e., between the banks of heating lamps 14, 15, of the forming apparatus so that the internal heat initially introduced by banks of heating lamps 7 and 8 does not dissipate to an undesirable extent.

It will also be noted that the nip opening between rollers 5 and 6 is sufficient to bond the two plies 3 and 4 together. The nip opening can be considerably less than the combined thickness of plies 3 and 4 as they enter said opening such that said plies are compressed to increase the density of the resulting composite sheet above that of either one or both plies. As described in co-pending application S.N. 370,715 entitled "Heat Transfer," filed May 27, 1964 and in which I am co-inventor with Jack P. Ercog and assigned to the assignee of the present application, this increases the rate of heat transfer through said composite sheet, thereby further increasing the heating effectiveness of banks of heating lamps 14, 15. Alternatively, the plies 3 and 4 can be separately compressed, in the manner taught by the above-mentioned application, prior to heating by banks of heating lamps 7 and 8. Still alternatively, the composite sheet 9 after leaving rollers 5 and 6 can be compressed as taught by said application.

It is also advantageous to maintain the outer surfaces of the plies 3 and 4 in an unheated condition so as to retain dimensional stability without the necessity of employing chain pairs to grip the edges of said plies prior to bonding into the composite sheet. The thickness of the plies 3 and 4 or any other plies employed need not be the same but can differ from each other as desired. Also, it is not necessary, although it is preferable, to heat both sides of composite sheet 9 as it passes to the forming members 16, 17; only one side thereof need be heated.

It is also to be noted that extremely thick sections can be provided with internal heat by utilizing more than two plies and by heating both surfaces of all inner plies. In addition the two ply composite sheet 9 shown in FIG. 1 can be utilized in place of either one or both of plies 3 and 4 to successively build up the thickness of the ultimate composite sheet. In this respect, it is important to prevent the undue loss of internal heat from the composite sheets until they have passed completely through the former.

It is to be understood that the above description is by way of example only and that details for carrying the invention into effect may be varied without departing from the scope of the invention.

What is claimed is:
1. A method of making articles from thermoplastic foam sheets comprising the steps of:
 (a) providing two separate thermoplastic foam sheet plies, each ply having approximately the same thickness;
 (b) heating one surface of each of said plies to a temperature below that at which said thermoplastic foam undergoes cellular collapse but at least to a temperature at which said plies can be bonded together;
 (c) pressing the two heated surfaces of said plies together to bond same into a composite two ply sheet;
 (d) heating the external surfaces of the composite sheet to a temperature below that at which said thermoplastic foam undergoes cellular collapse, but at least to a temperature at which said sheet can be deformed without rupture; and,
 (e) draw-forming said composite sheet while still heated into said artcile.
2. The method of claim 1 wherein the foam sheets are polystyrene foam sheets and the heating in steps (b) and (d) is to a temperature in the range from about 180° F. to about 250° F.
3. The method of claim 1 wherein the forming in step (e) is vacuum forming.
4. A method of making articles from thermoplastic foam sheets comprising the steps of:
 (a) providing a plurality of separate thermoplastic foam sheet plies, each ply having approximately the same thickness;
 (b) heating both surfaces of all but two of said plurality of plies to a temperature below that at which said thermoplastic foam undergoes cellular collapse but at least to a temperature at which said plies can be bonded together;
 (c) heating one surface of each of the remaining two of said plurality of plies to the same temperature as the other plies;
 (d) pressing the heated surfaces of all the plies together to bond same into a composite sheet having a plurality of plies;
 (e) heating the external surfaces of the composite sheet to a temperature below that at which said thermoplastic foam undergoes cellular collapse, but at least to a temperature at which said sheet can be deformed without rupture; and,
 (f) forming said sheet while still heated into said article.

References Cited

UNITED STATES PATENTS

| | | | |
|---|---|---|---|
| 2,878,153 | 3/1959 | Hacklander | 264—321 XR |
| 2,957,793 | 10/1960 | Dickey. | |
| 3,039,911 | 6/1962 | Fox | 264—321 XR |
| 3,062,698 | 11/1962 | Aykanian | 156—322 XR |
| 3,066,211 | 11/1962 | Vogt | 219—34 |
| 3,104,192 | 9/1963 | Hacklander | 264—321 XR |
| 3,137,747 | 6/1964 | Kline | 264—321 XR |
| 3,189,399 | 6/1965 | Jacobs et al. | |
| 3,220,902 | 11/1965 | Edwards | 264—321 XR |
| 3,234,065 | 2/1966 | Best | 264—321 XR |
| 3,239,399 | 3/1966 | King | 156—82 |
| 3,264,160 | 8/1966 | Donofrio | 156—306 |

FOREIGN PATENTS 603,631    4/1960    Italy.

OTHER REFERENCES

Collins, F. H., "Controlled density polystyrene foam extrusion" in SPE Journal, July 1960, pp. 705–709.

Koppers booklet, "Technical manual Dylite expandable polystyrene; thermoforming foam polystyrene sheet and polystyrene foam polystyrene laminates." Bulletin C–9 273, Chapter 4c, Apr. 15, 1962, p. 3–7.

ALEXANDER H. BRODMERKEL, *Primary Examiner.*

ROBERT F. WHITE, *Examiner.*

P. E. ANDERSON, *Assistant Examiner.*